United States Patent
Ohguri et al.

(10) Patent No.: US 12,553,836 B2
(45) Date of Patent: Feb. 17, 2026

(54) RADIOGRAPHIC IMAGING APPARATUS AND RADIOGRAPHIC IMAGING

(71) Applicant: CANON KABUSHIKI KAISHA, Tokyo (JP)

(72) Inventors: Hirokazu Ohguri, Chiba (JP); Asato Kosuge, Kanagawa (JP); Hideaki Morita, Tokyo (JP); Hiroto Ueno, Kanagawa (JP); Yoshiaki Serizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 18/584,873

(22) Filed: Feb. 22, 2024

(65) Prior Publication Data
US 2024/0288386 A1    Aug. 29, 2024

(30) Foreign Application Priority Data
Feb. 24, 2023   (JP) .................... 2023-027567

(51) Int. Cl.
*G01N 23/04*    (2018.01)

(52) U.S. Cl.
CPC ....... *G01N 23/04* (2013.01); *G01N 2223/304* (2013.01)

(58) Field of Classification Search
CPC .............. G01N 23/04; G01N 2223/304; A61B 6/4233; A61B 6/44; A61B 6/548; A61B 6/566
See application file for complete search history.

(56) References Cited

U.S. PATENT DOCUMENTS

| | | | |
|---|---|---|---|
| 11,969,284 B2 * | 4/2024 | Iijima | A61B 6/56 |
| 12,150,805 B2 * | 11/2024 | Ohguri | A61B 6/54 |

FOREIGN PATENT DOCUMENTS

| | | | |
|---|---|---|---|
| JP | 2002165142 A | 6/2002 | |
| JP | 2002272720 A | 9/2002 | |

\* cited by examiner

*Primary Examiner* — Courtney D Thomas
(74) *Attorney, Agent, or Firm* — Canon U.S.A., Inc. IP Division

(57) ABSTRACT

A radiographic imaging apparatus includes a selection unit configured to select a preparatory driving mode from among a plurality of preparatory driving modes, and a drive unit configured to perform preparatory driving in the preparatory driving mode selected by the selection unit during a transition time of transition from a standby state to an imaging enabled state, wherein the plurality of preparatory driving modes is different from each other in the transition time of transition from the standby state to the imaging enabled state, and wherein the selection unit selects a preparatory driving mode from among the plurality of preparatory driving modes such that the transition time of transition from the standby state to the imaging enabled state is equal to or shorter than a radiation irradiation preparation time of a radiation generation apparatus.

20 Claims, 11 Drawing Sheets

FIG.5

| ACCUMULATION TIME Ta [ms] | PREPARATORY DRIVING MODE | IMAGING PREPARATION TIME Tp [ms] |
|---|---|---|
| Ta1 < | FIRST PREPARATORY DRIVING MODE | Tp11 |
| | SECOND PREPARATORY DRIVING MODE | Tp12 |
| ≤ Ta1 | FIRST PREPARATORY DRIVING MODE | Tp21 |
| | SECOND PREPARATORY DRIVING MODE | Tp22 |

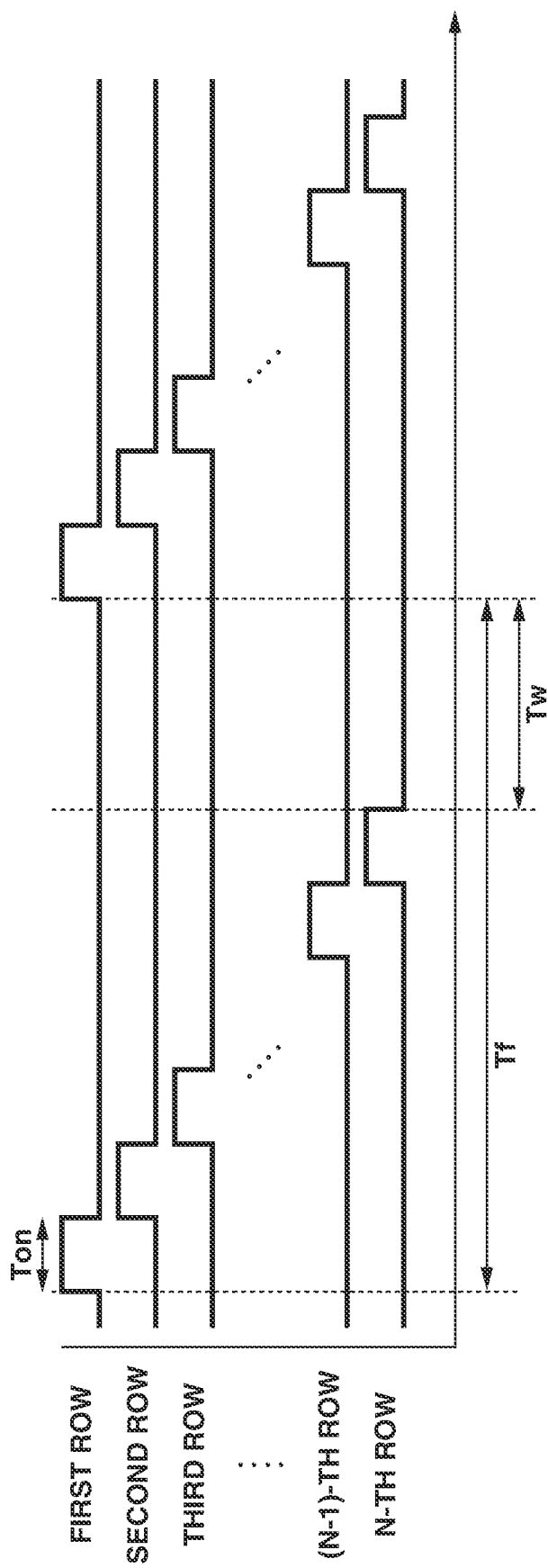

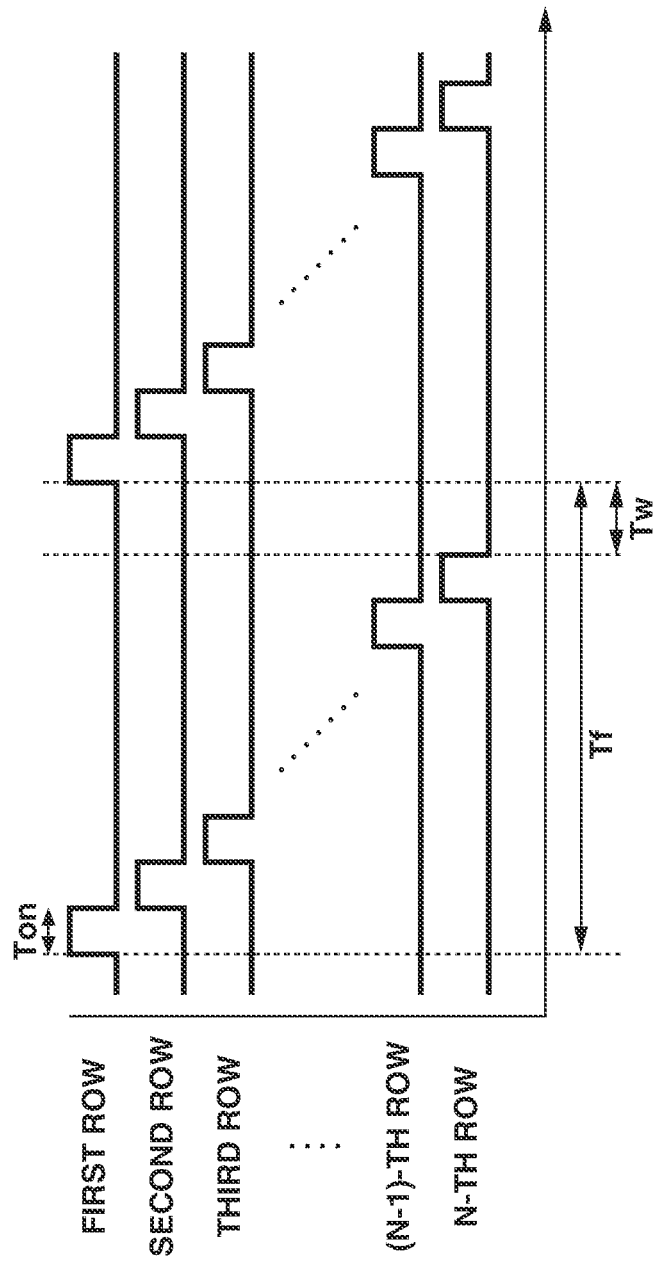

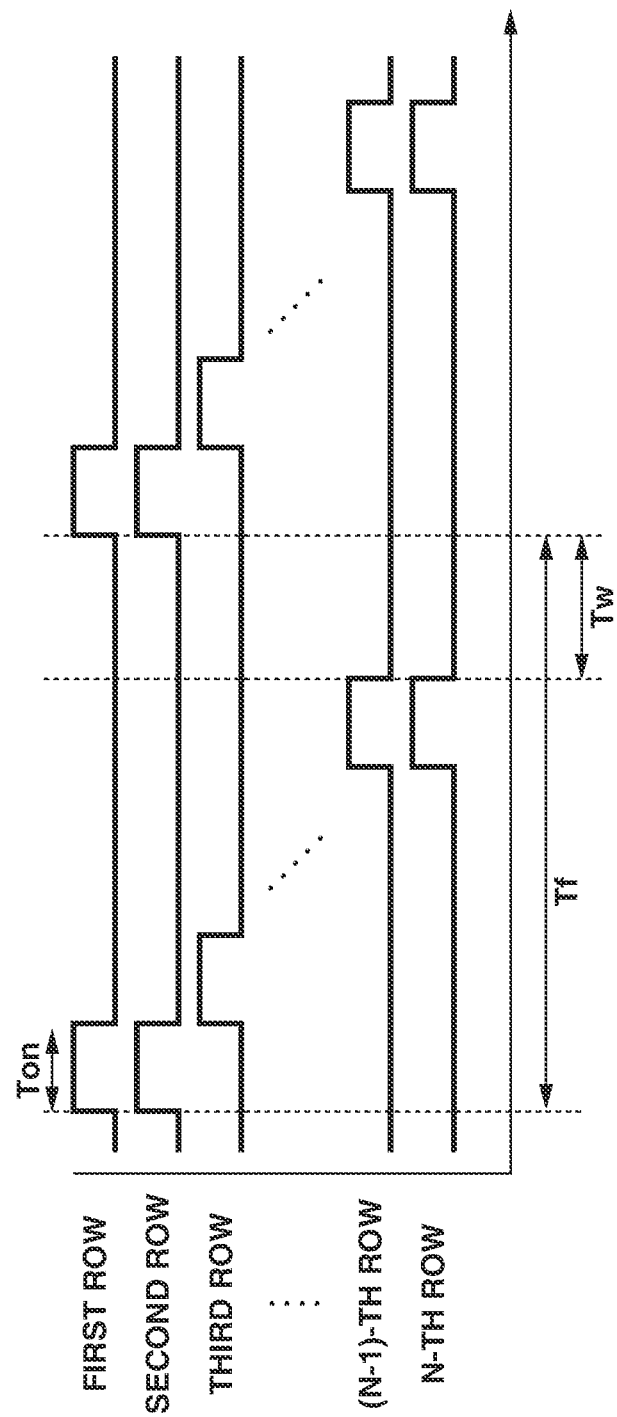

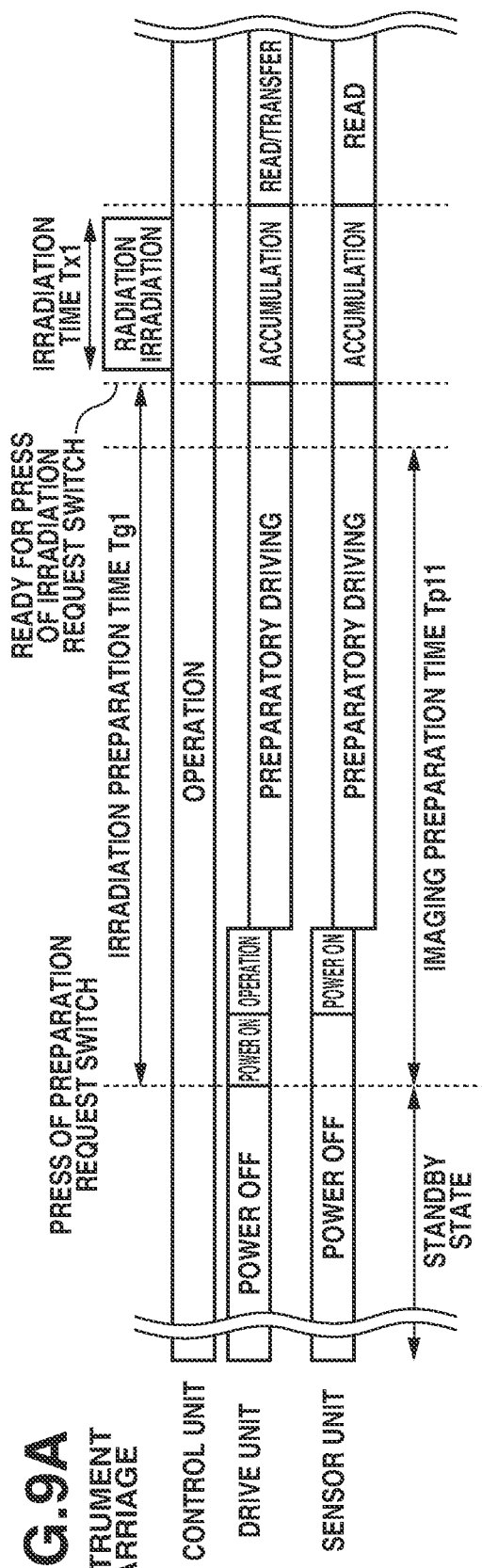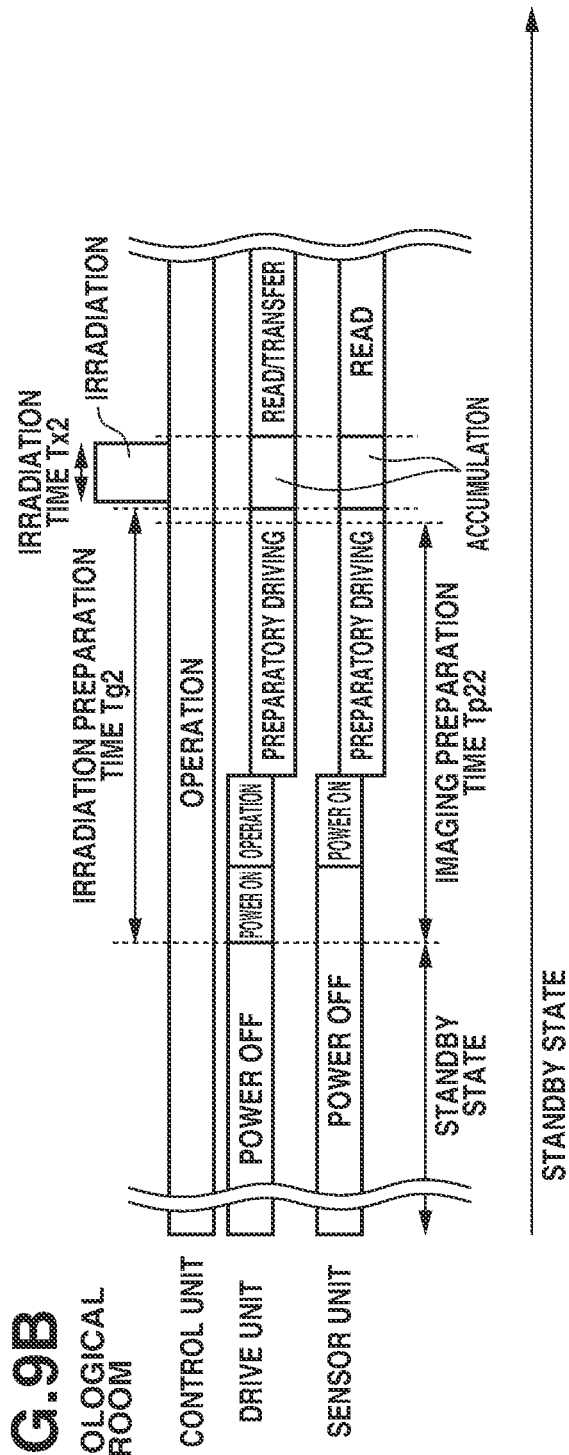

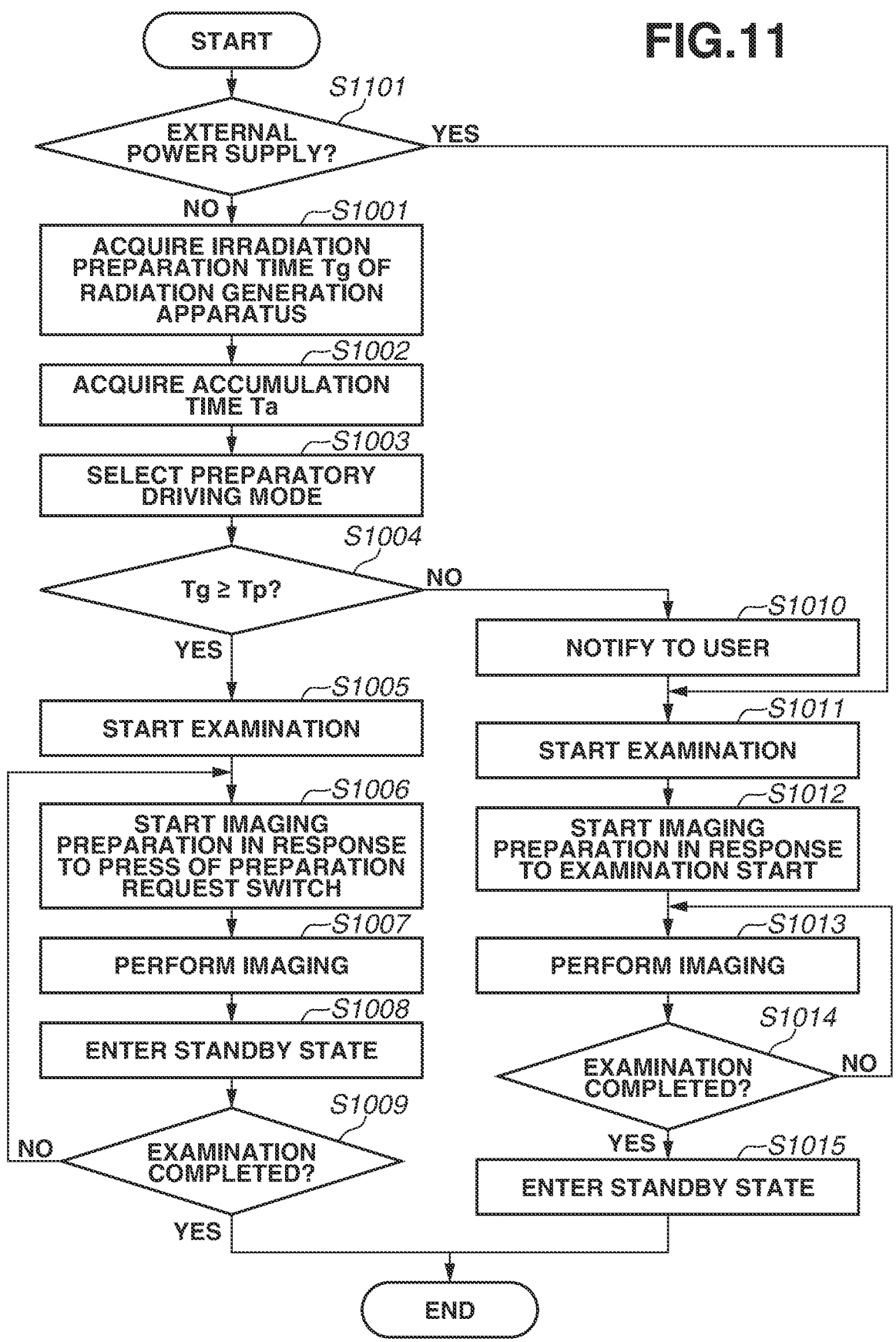

RADIOGRAPHIC IMAGING APPARATUS AND RADIOGRAPHIC IMAGING

BACKGROUND OF THE DISCLOSURE

Field of the Disclosure

The present disclosure relates to a radiographic imaging apparatus and a radiographic imaging system, a control method of the radiographic imaging apparatus, and a control method of the radiographic imaging system.

Description of the Related Art

In recent years, radiographic imaging systems have been increasingly digitized along with the popularization of radiographic imaging apparatuses that generate digital radiographic images based on incident radiation. The digitization of radiographic imaging systems enables users to review images immediately after radiographic imaging, which have significantly improved a workflow as compared with conventional imaging procedures using films or computed radiography (CR) apparatuses.

In addition, the development of wireless radiographic imaging apparatuses helps users to easily handle the apparatuses. Because such a wireless radiographic imaging apparatus operates on a battery, the number of images capable of being captured on a single battery charge affects its usability. In order to increase the number of images capable of being captured, it is necessary to lower power consumption in the radiographic imaging apparatus. Meanwhile, digital radiographic imaging apparatus takes a certain period of waiting time from when a standby state in which power consumption is smaller than power consumption in the imaging enabled state is cancelled until when the state transition to the imaging enabled state is completed.

Regarding the cancellation of the standby state, Japanese Patent Application Laid-Open No. 2002-165142 discusses a plurality of methods for cancelling the standby state because a period of time until imaging is performed is better to be shortened for the user and the patent. Japanese Patent Application Laid-Open No. 2002-272720 discusses a method for cancelling the standby state in response to an input of an imaging order.

While, as described above, Japanese Patent Application Laid-Open No. 2002-165142 discusses a plurality of standby state cancelling methods, if the user selects a cancelling method with which a period of time until the standby state is cancelled is long with respect to the waiting time for radiation irradiation, the user will have to wait for an increased period of time and may feel stress from this.

Japanese Patent Application Laid-Open No. 2002-272720 discusses a method in which the standby state is cancelled in response to an input of an imaging order. However, this method has an issue that if the period of time from when an imaging order is input until when the imaging is started is long, power consumption will increase.

SUMMARY OF THE DISCLOSURE

The present disclosure is directed to shortening a time of transition from a standby state to an imaging enabled state of a radiographic imaging apparatus.

According to an aspect of the present disclosure, a radiographic imaging apparatus includes a selection unit configured to select a preparatory driving mode from among a plurality of preparatory driving modes, and a drive unit configured to perform preparatory driving in the preparatory driving mode selected by the selection unit during a transition time of transition from a standby state to an imaging enabled state, wherein the plurality of preparatory driving modes is different from each other in the transition time of transition from the standby state to the imaging enabled state, and wherein the selection unit selects a preparatory driving mode from among the plurality of preparatory driving modes such that the transition time of transition from the standby state to the imaging enabled state is equal to or shorter than a radiation irradiation preparation time of a radiation generation apparatus.

Further features of the present disclosure will become apparent from the following description of exemplary embodiments with reference to the attached drawings.

BRIEF DESCRIPTION OF THE DRAWINGS

FIG. 5 is a diagram illustrating an example of a lookup table.

FIG. 6 is a diagram illustrating an example of preparatory driving.

FIG. 7 is a diagram illustrating an example of preparatory driving.

FIG. 8 is a diagram illustrating an example of preparatory driving.

FIGS. 9A and 9B are diagrams illustrating transition operations of the radiographic imaging apparatus.

FIG. 11 is a flowchart illustrating an example of a processing procedure.

DESCRIPTION OF THE EMBODIMENTS

Hereinafter, exemplary embodiments will be described with reference to the drawings. The exemplary embodiments described below do not limit the scope of the claims, and not all combinations of features described in the exemplary embodiments are essential as solving means. In the exemplary embodiment described below, X-rays are desirably used as radiations, but the radiations are not limited thereto, and other radiations such as alpha ($\alpha$) rays, beta ($\beta$) rays, and gamma ($\gamma$) rays can also be applied.

Figure 1:
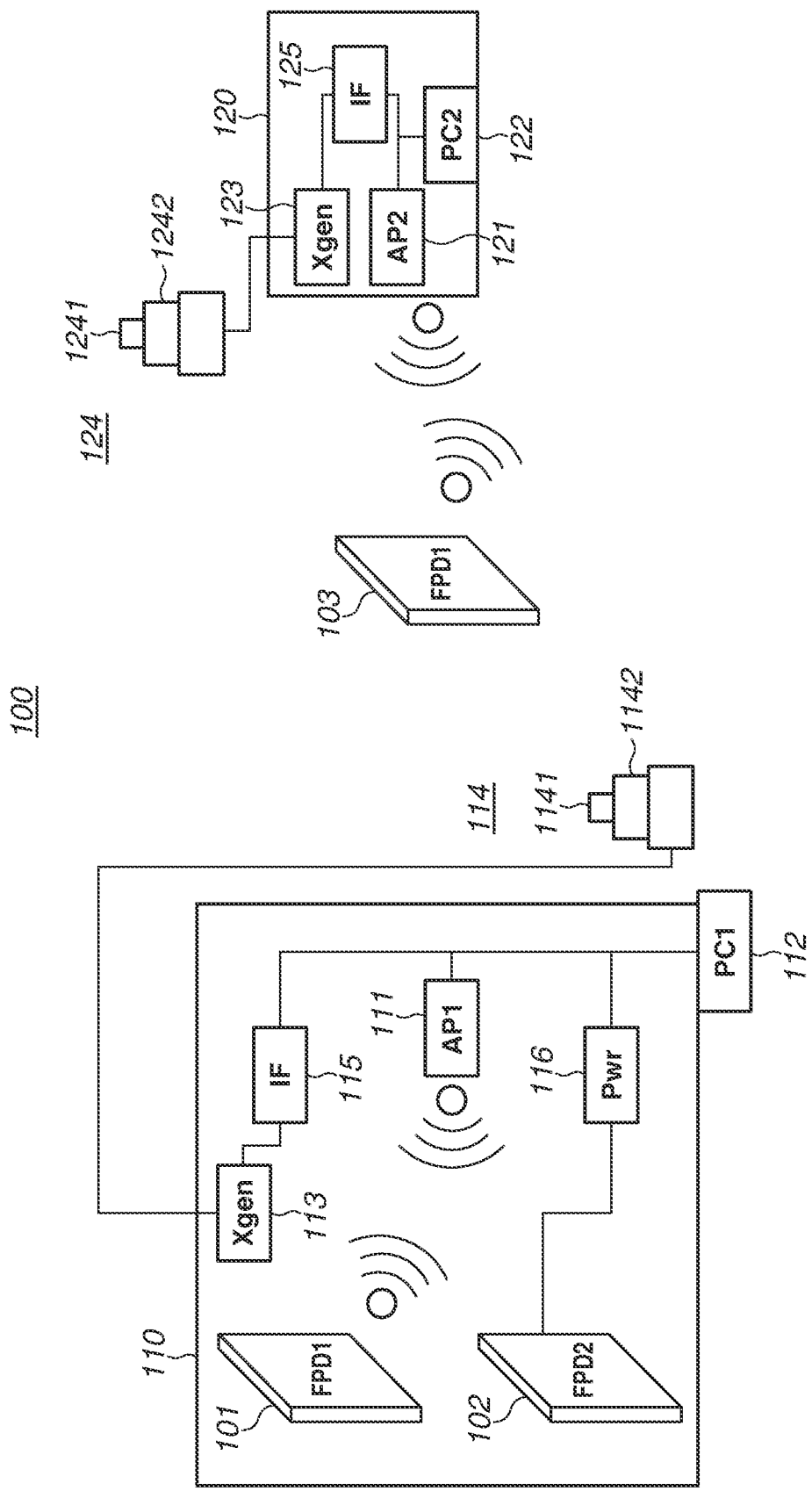
FIG. 1 is a diagram illustrating an example of a radiographic imaging system.

FIG. 1 is a diagram illustrating an example of a configuration of a radiographic imaging system 100 according to a first exemplary embodiment. The radiographic imaging system 100 includes components of a radiological room 110 and components of an instrument carriage 120.

A radiographic imaging apparatus 101 and a radiographic imaging apparatus 102 are radiographic imaging apparatuses of the radiological room 110 (specifically, disposed inside the radiological room 110). A radiographic imaging apparatus 103 is a radiographic imaging apparatus of the instrument carriage 120, and the radiographic imaging apparatus 103 is movable to any position, for example. These radiographic imaging apparatuses 101 to 103 are operated with a battery or with an external power supply.

As the components of the radiological room 110, in addition to the radiographic imaging apparatuses 101 and 102, a wireless access point 111 (described as "AP1" in FIG. 1) and a console 112 (described as "PC1" in FIG. 1) that controls the radiographic imaging apparatuses 101 and 102 are disposed. Further, as the components of the radiological room 110, a radiation generation apparatus 113 (described as "Xgen" in FIG. 1) and a radiation switch 114 are disposed. Further, as the components of the radiological room 110, a relay 115 (described as "IF" in FIG. 1) that adjusts timings between the radiographic imaging apparatuses 101 and 102 and the radiation generation apparatus 113, and a power supply apparatus 116 (described as "Pwr" in FIG. 1) are disposed.

The radiation switch 114 includes a preparation request switch 1141 for issuing a radiation irradiation preparation request to the radiation generation apparatus 113 and an irradiation request switch 1142 for issuing a radiation irradiation request to the radiation generation apparatus 113. The preparation request switch 1141 and the irradiation request switch 1142 are two-step switches, and the preparation request switch 1141 is pressed prior to the irradiation request switch 1142.

The power supply apparatus 116 is an apparatus for supplying power (electric power) to a radiographic imaging apparatus, which is for example, the radiographic imaging apparatus 102 in FIG. 1. Besides serving as power supply, the power supply apparatus 116 has an interface capable of wired communication and can relay communication between the radiographic imaging apparatus and each communication apparatus.

The radiographic imaging apparatus 101 operates on a battery and conducts wireless communication with the wireless access point 111 to transmit a radiographic image to the console 112. The radiographic imaging apparatus 102 is connected to the power supply apparatus 116 and operates with an external power supply to conduct wired communication.

As the components of the instrument carriage 120, in addition to the radiographic imaging apparatus 103, a wireless access point 121 (described as "AP2" in FIG. 1) and a console 122 (described as "PC2" in FIG. 1) that controls the radiographic imaging apparatus 103 are disposed. Further, as the components of the instrument carriage 120, a radiation generation apparatus 123 (described as "Xgen" in FIG. 1), a radiation switch 124, and a relay 125 (described as "IF" in FIG. 1) that adjusts timings between the radiographic imaging apparatus 103 and the radiation generation apparatus 123 are disposed.

The radiation switch 124 includes a preparation request switch 1241 for issuing a radiation irradiation preparation request to the radiation generation apparatus 123 and an irradiation request switch 1242 for issuing a radiation irradiation request to the radiation generation apparatus 123. The preparation request switch 1241 and the irradiation request switch 1242 are two-step switches, like the preparation request switch 1141 and the irradiation request switch 1142. In a case of using the radiographic imaging apparatus 103 together with the instrument carriage 120, the radiographic imaging apparatus 103 conducts wireless communication with the wireless access point 121 to transmit a radiographic image to the console 122.

The radiographic imaging apparatuses 101 to 103 can switch between wireless communication connection and wired communication connection in the radiological room 110 and the instrument carriage 120.

Figure 2:
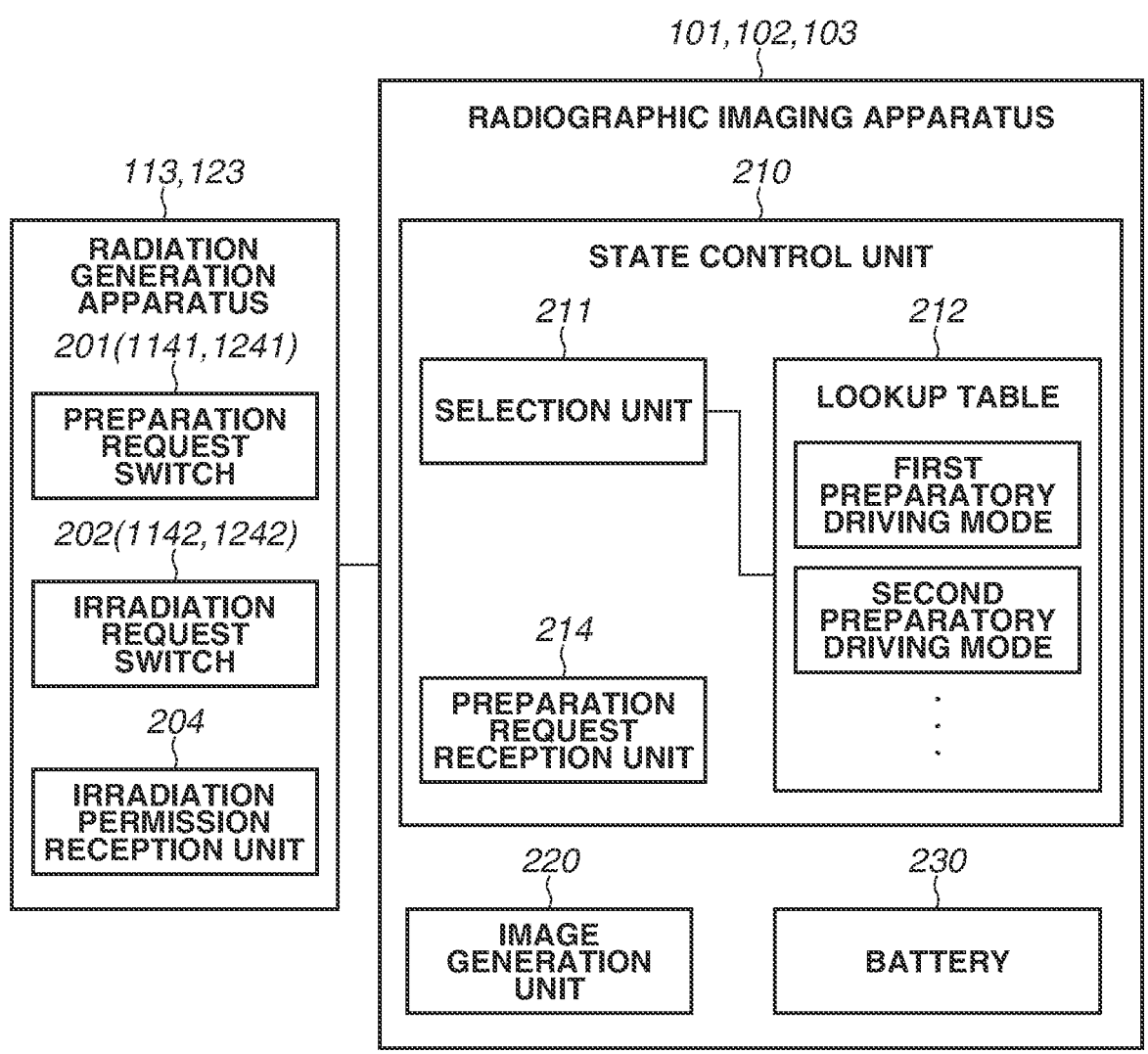
FIG. 2 is a diagram illustrating an example of a functional configuration of a radiation generation apparatus and a radiographic imaging apparatus.

FIG. 2 is a diagram illustrating an example of a functional configuration of the radiation generation apparatuses 113 and 123 and the radiographic imaging apparatuses 101, 102, and 103 illustrated in FIG. 1.

As illustrated in FIG. 2, the radiation generation apparatuses 113 and 123 each include a preparation request switch 201, an irradiation request switch 202, and an irradiation permission reception unit 204. The preparation request switch 201 is a switch corresponding to the preparation request switches 1141 and 1241 illustrated in FIG. 1. The irradiation request switch 202 is a switch corresponding to the irradiation request switches 1142 and 1242 illustrated in FIG. 1.

In response to the preparation request switch 201 being pressed, the radiation generation apparatuses 113 and 123 transmit information about a preparation request to the radiographic imaging apparatuses 101, 102, and 103. In response to the irradiation request switch 202 is pressed, the radiation generation apparatuses 113 and 123 transmit information about an irradiation request to the radiographic imaging apparatuses 101, 102, and 103. The radiation generation apparatuses 113 and 123 perform radiation irradiation in response to the irradiation permission reception unit 204 receiving information about a radiation irradiation permission in a state where radiation irradiation is enabled.

The radiographic imaging apparatuses 101, 102, and 103 each include a state control unit 210, an image generation unit 220, and a battery 230 as illustrated in FIG. 2. The radiographic imaging apparatuses 101, 102, and 103 switch, via the state control unit 210, between a standby state in which power consumption is lower than that in an imaging enabled state and the imaging enabled state. As illustrated in FIG. 2, the state control unit 210 includes a selection unit 211, a lookup table 212 including information about a plurality of preparatory driving modes, and a preparation request reception unit 214 that receives a radiation irradiation preparation request.

The preparation request reception unit 214 is a reception unit that receives information about a radiation irradiation preparation request, which is information containing radiation irradiation preparation start information, from the radiation generation apparatuses 113 and 123.

The lookup table 212 is defined, so that the selection unit 211 selects a preparatory driving mode suitable for an irradiation preparation time Tg of the radiation generation apparatus and an accumulation time Ta during which electric charges generated by incident radiation are accumulated. Details of the lookup table 212 and the selection operation will be described below.

The accumulation time Ta is set on the consoles 112 and 122 having received an imaging order from an in-hospital system or the like, and is received by the selection unit 211 as part of the imaging-related information sent to the radiographic imaging apparatuses 101, 102, and 103. Radiation irradiation characteristics of the individual radiation generation apparatuses are characteristics including the irradiation preparation time Tg during which the radiation generation apparatus performs a transition from the standby state to the radiation irradiation-enabled state. In the present exemplary embodiment, time information about time to be taken for the radiation generation apparatuses 113 and 123 to perform irradiation preparation is called irradiation preparation time Tg. The irradiation preparation time Tg includes a period of time until a rotation state of the rotating anode is stabled and the in-plane distribution of the radiation becomes uniform, which varies between the X-ray tubes of the radiation generation apparatuses 113 and 123. The irradiation preparation time Tg of the radiation generation apparatus 123 in the instrument carriage 120 is often longer than the irradiation preparation time Tg of the radiation generation apparatus 113 in the radiological room 110.

For example, even if the irradiation request switch 202 is pressed, no irradiation request is issued until the irradiation preparation time Tg has elapsed. After a lapse of the irradiation preparation time Tg, an irradiation request is issued. The preparation request switch 201 and the irradiation request switch 202 are generally configured as an integrated two-step switch. In the present exemplary embodiment, the radiation irradiation characteristics described above are calculated using radiation irradiation preparation start information in the radiation generation apparatuses 113 and 123 and radiation irradiation preparation completion information in the radiation generation apparatuses 113 and 123, for example.

The image generation unit 220 is a component that generates a radiographic image based on incident radiation.

The battery 230 is an internal power supply unit for causing the radiographic imaging apparatus 101, 102, or 103 to be operable even without an external power supply. The battery 230 is reusable by recharging, as typified by a lithium-ion battery or the like. The battery 230 may be incorporated in an undetachable manner or may be disposed in a detachable manner. The battery 230 may be recharged by a recharger that can recharge the removed battery 230 alone or may be recharged by another power source in a state in which being incorporated in the radiographic imaging apparatus 101, 102, or 103.

Figure 3:
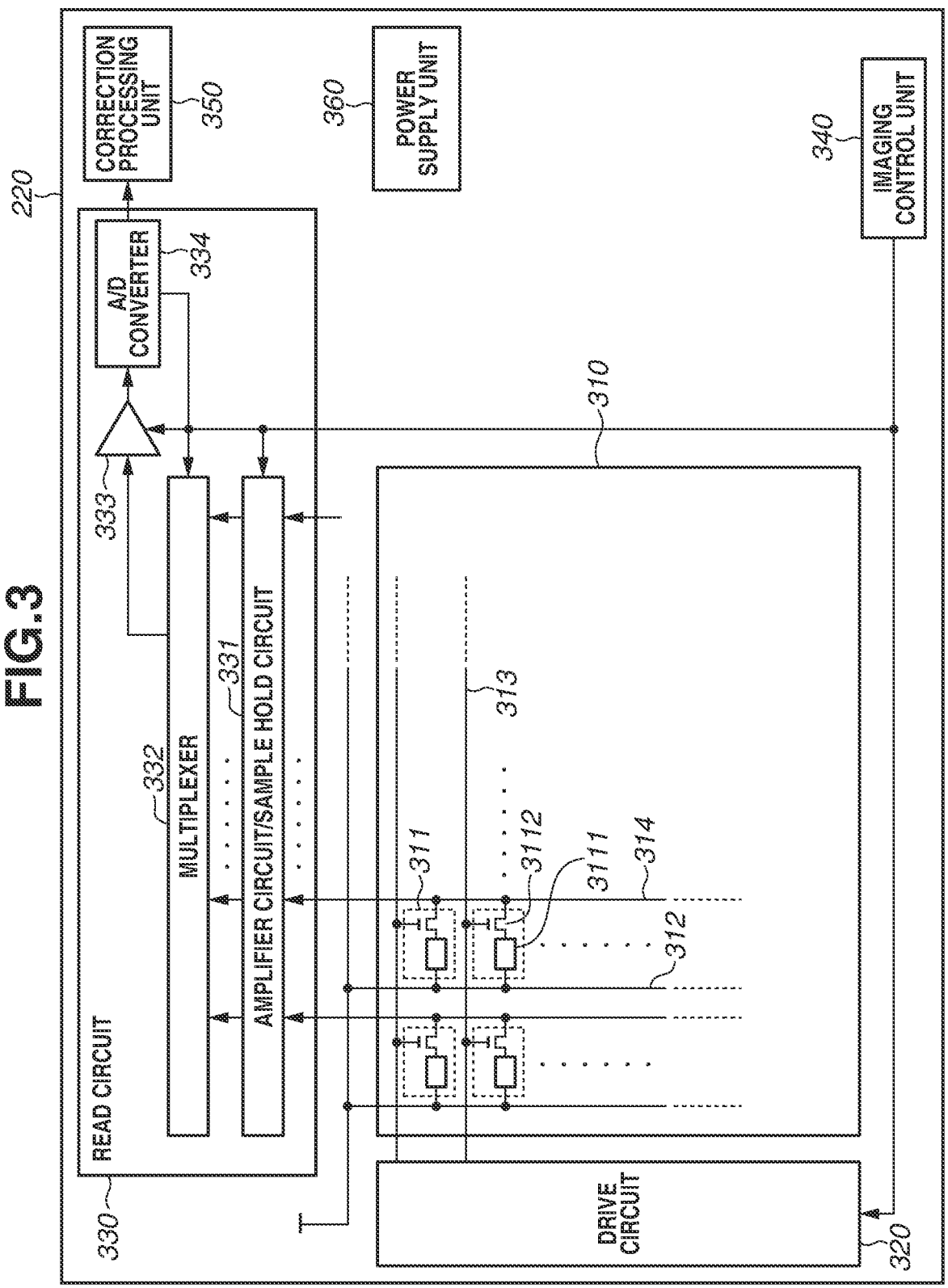
FIG. 3 is a diagram illustrating an example of a configuration of an image generation unit.

FIG. 3 is a diagram illustrating an example of an internal configuration of the image generation unit 220 illustrated in FIG. 2. As illustrated in FIG. 3, the image generation unit 220 includes a sensor 310, a drive circuit 320, a read circuit 330, an imaging control unit 340, a correction processing unit 350, and a power supply unit 360.

The sensor 310 includes a plurality of pixels 311 that is arranged in a two-dimensional array forming a plurality of rows and a plurality of columns. Each of the plurality of pixels 311 includes a conversion element 3111 and a switch element 3112. The conversion element 3111 converts incident radiation into electric charges that are electrical signals, and accumulates the electric charges. The conversion element 3111 may include a scintillator that converts radiation into visible light and a photoelectric conversion element that converts visible light into electric charges, or may be an element that directly converts radiation into electric charges.

The switch element 3112 transfers the electric charges accumulated in the conversion element 3111 to a signal line 314. The switch element 3112 includes a transistor, such as a thin-film transistor (TFT). The switch element 3112 has a control terminal. The switch element 3112 turns ON, that is, enters a conductive state, in response to an ON voltage being applied to the control terminal, and turns OFF, that is, enters a non-conductive state, in response to an OFF voltage being applied to the control terminal.

A bias voltage from the power supply unit 360 is applied to one terminal of the conversion element 3111 via a bias line 312. The other terminal of the conversion element 3111 is connected to the signal line 314 via the switch element 3112. The control terminal of the switch element 3112 is connected to a drive line 313.

In the sensor 310, a plurality of drive lines 313 extending in a row direction, which is a horizontal direction in FIG. 3, is arranged in a column direction, which is a vertical direction in FIG. 3. The control terminals of the switch elements 3112 of the pixels 311 included in the same row are connected to a corresponding one of the drive lines 313. In the sensor 310, a plurality of signal lines 314 extending in the column direction is arranged in the row direction. Terminals, each of which is one of the main terminals, of the switch elements 3112 of the pixels 311 included in the same column are connected to a corresponding one of the signal lines 314.

The drive circuit 320 drives the sensor 310 in accordance with a control signal supplied from the imaging control unit 340. Specifically, the drive circuit 320 supplies a drive signal to the control terminals of the switch elements 3112 via the drive lines 313. The drive circuit 320 turns ON the switch elements 3112 by setting the drive signal to the ON voltage, and turns OFF the switch elements 3112 by setting the drive signal to the OFF voltage. In response to the switch elements 3112 being turned ON, the electric charges accumulated in the conversion elements 3111 are transferred to the signal lines 314.

The read circuit 330 reads the electric charges from the sensor 310 in accordance with a control signal supplied from the imaging control unit 340, and generates signals based on the electric charges. Then, the read circuit 330 supplies the generated signals to the correction processing unit 350. The read circuit 330 includes a sample hold circuit 331, a multiplexer 332, an amplifier 333, and an analog/digital (A/D) converter 334 as illustrated in FIG. 3.

The sample hold circuit 331 holds the electric charges read from the conversion elements 3111 on a pixel row basis. The sample hold circuit 331 may include an amplifier circuit. The multiplexer 332 retrieves the electric charges in sequence from one row of pixels held in the sample hold circuit 331 and supplies the electric charges to the amplifier 333. The amplifier 333 amplifies the electric charges supplied from the multiplexer 332 and supplies the amplified electric charges to the A/D converter 334. The A/D converter 334 converts the analog signals supplied from the amplifier 333 into digital signals, which is equivalent to the data of the radiographic image described above, and supplies the digital signals to the correction processing unit 350.

The correction processing unit 350 performs, for example, dark frame subtraction to the radiographic image converted into digital values by acquiring a dark image from only dark charge components without radiation irradiation and subtracting the data of the acquired dark image from the data of the radiographic image, obtaining a captured image from which the unnecessary dark charge components have been eliminated. The power supply unit 360 supplies main operating voltages, such as a bias voltage, and is operable with an external power supply or with a power supply from the battery 230.

The lookup table 212 illustrated in FIG. 2 relates to state transition characteristics of the radiographic imaging apparatus 101, 102, or 103 from the standby state to the imaging enabled state. The state transition characteristics are characteristics including time of transition from the standby state to the imaging enabled state. In the present exemplary embodiment, time information about transition of the radiographic imaging apparatus 101, 102, or 103 from the standby state to the imaging enabled state will be referred to as imaging preparation time Tp. The imaging preparation time Tp includes time from when the sensor 310 is powered until when the electric charge accumulation characteristics become stable and the artifact disappears. This means that the apparatus does not enter the imaging enabled state immediately after cancellation of the standby state, and a certain period of time is required.

As a means for promptly stabilizing the electric charge accumulation characteristics during the state transition, the drive circuit 320 drives the sensor 310 during the state transition to continuously discharge the dark charge components. Driving and operating the drive circuit 320 together with the read circuit 330 to stabilize the electric charge accumulation characteristics during the state transition is referred to as preparatory driving in the present exemplary embodiment to make a distinction from the driving for reading the accumulated electric charges as image data. The sensor 310 generally has characteristics with which the imaging preparation time Tp is shortened by the preparatory driving and is further shortened by increasing the number of iterations of the preparatory driving per unit time.

The lookup table 212 relates to the accumulation time Ta during which electric charges generated by radiation irradiation are accumulated. The accumulation time Ta is a period of time during which the operations of the drive circuit 320 and the read circuit 330 are stopped, the switch elements 3112 described above are turned OFF, and the state of accumulating electric charges generated by the incident radiation is maintained. In general, the imaging preparation time Tp is shortened with decrease in the accumulation time Ta.

Figure 4:
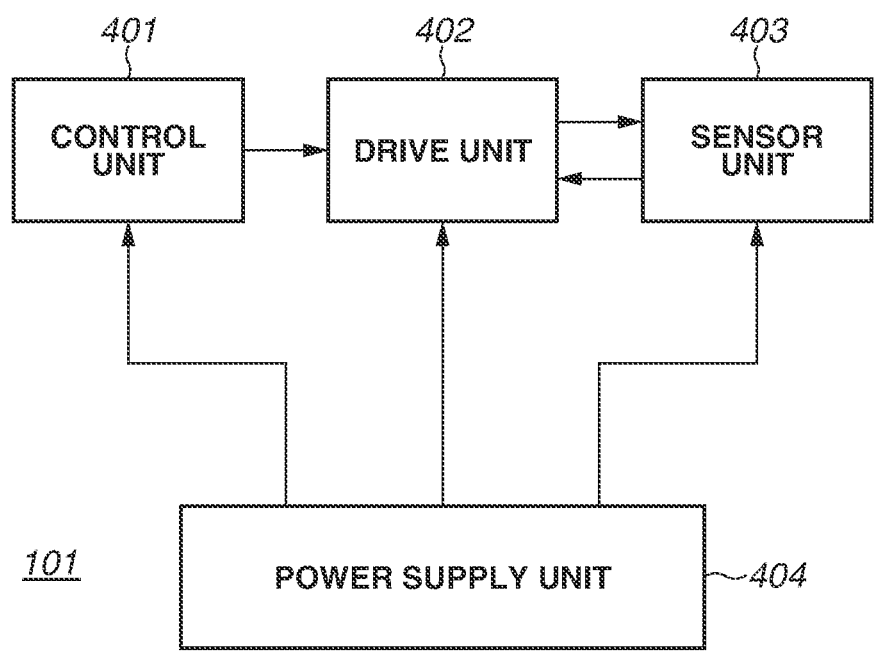
FIG. 4 is a diagram illustrating an example of a configuration of the radiographic imaging apparatus.

FIG. 4 is a diagram illustrating functional blocks of the configuration, of the radiographic imaging apparatuses 101, 102, and 103 described in FIGS. 2 and 3, divided by power supply control. In the following description, the radiographic imaging apparatus 101 will be taken as a representative example.

The internal electric components of the radiographic imaging apparatus 101 can be roughly divided into a control unit 401, a drive unit 402, a sensor unit 403, and a power supply unit 404. The sensor unit 403 that generates a radiographic image based on incident radiation includes the sensor 310, the drive circuit 320, and the read circuit 330 in the image generation unit 220 illustrated in FIG. 3.

The drive unit 402 includes a part of the imaging control unit 340 of the image generation unit 220 illustrated in FIG. 3, and may include programmable logical circuits, such as a field programmable gate array (FPGA) and a complex programmable logic device (CPLD). The drive unit 402 controls operations, such as driving and reading of the sensor unit 403.

The control unit 401 includes part of the state control unit 210 illustrated in FIG. 2 and part of the correction processing unit 350 and the imaging control unit 340 illustrated in FIG. 3, and performs control of the drive unit 402 and communication with external devices. The control unit 401 may include a central processing unit (CPU), memories, such as a flash memory and a dynamic random access memory (DRAM) that are peripheral circuits of the CPU, wireless and wired communication interfaces, and others. The power supply unit 404 can individually supply power to the control unit 401, the drive unit 402, and the sensor unit 403.

The control unit 401 and the drive unit 402 are functionally divided but are not required to be separated from each other as devices. The control unit 401 and the drive unit 402 may be configured as one device such as an application specific integrated circuit (ASIC) in which a CPU and logical circuits are in the same package or an FPGA with a built-in CPU. Even in that case, the control unit 401 and the drive unit 402 are desirably configured to be individually powered.

FIGS. 5 to 8 are diagrams illustrating relationships between details of the lookup table 212 and each parameter.

FIG. 5 is a diagram illustrating an example of the lookup table 212 in the present exemplary embodiment.

The lookup table 212 defines the accumulation time Ta, the preparatory driving mode, and the imaging preparation time Tp determined by the accumulation time Ta and the preparatory driving mode. The accumulation time Ta is set to be longer than an irradiation time Tx for radiation irradiation because the emitted radiation needs to be accumulated without being wasted in generation of image data, and the accumulation time Ta needs to be selected in accordance with the necessary irradiation time Tx which varies based on the body parts to be imaged and the imaging procedures. Even in a case of the same body part and the same procedure, since the necessary radiation dosage varies based on the body shape of the subject, the irradiation time Tx may vary accordingly. Furthermore, the performance of radiation output may be different among radiation generation apparatuses.

The radiation generation apparatus 113 in the radiological room 110 can generally perform radiation emission at a high power output because the radiation generation apparatus 113 receives stable power supply. In contrast, the radiation generation apparatus 123 mounted in the instrument carriage 120 generally has a lower power output than the radiation generation apparatuses in the radiological room 110 due to the use of the battery as a power source, and has a tendency of further lengthening of the irradiation time Tx.

The imaging preparation time Tp refers to a period of time of transition from the standby state in which power consumption is low and imaging is not able to be performed, to the imaging enabled state in which power consumption is higher than the power consumption in the standby state and imaging is able to be performed. In the present exemplary embodiment, the standby state refers to a state in which the control unit 401 described above is powered and in operation but the drive unit 402 and the sensor unit 403 are not powered and not in operation.

The imaging enabled state refers to a state in which the drive unit 402 and the sensor unit 403 are both powered and preparations for an operation for imaging is completed.

In the transition from the standby state to the imaging enabled state, the logical circuits, such as the ASIC and FPGA equivalent to the drive unit 402, are powered ON, a circuit configuration and an initial setting are performed, and the sensor unit 403 is powered ON, so that the preparatory driving is performed. In the present exemplary embodiment, the standby state indicates that the drive unit 402 is powered OFF, but the units set to be powered ON and the units set to be in operation can be changed in accordance with the power-saving performance to be achieved.

If the imaging preparation time Tp is longer than the irradiation preparation time Tg of the radiation generation apparatus, the user has to wait for a long time by the imaging preparation time Tp, and thus these times are set such that the relationship between the imaging preparation time Tp and the irradiation preparation time Tg satisfies Tp≤Tg. Meanwhile, there is also the relationship between the accumulation time Ta and the imaging preparation time Tp in which the imaging preparation time Tp is lengthened with increase in the accumulation time Ta, in general. Further, even with the same accumulation time Ta, the imaging preparation time Tp varies in accordance with the preparatory driving mode.

FIG. 6 is a timing chart illustrating preparatory driving in the case where the preparatory driving mode is set to a first preparatory driving mode in FIG. 5. In the preparatory driving of the present exemplary embodiment, N rows in the sensor 310 are selected in sequence by the drive circuit 320 to turn ON the switch elements 3112, and electric charges resulting from dark components that have been accumulated after the power-ON of the sensor 310 are discharged in sequence until the dark characteristics become stable. In general, increasing the number of times of turning ON the switch elements 3112 per unit time shortens the period of time until the dark characteristics become stable, which shortens the imaging preparation time Tp. In the timing chart, a time Tf indicates one frame time in the preparatory driving.

FIGS. 7 and 8 are timing charts illustrating examples in which the preparatory driving mode is set to a second preparatory driving mode in FIG. 5. In the preparatory driving in the second preparatory driving mode, the imaging preparation time Tp is shorter than the imaging preparation time Tp in the first preparatory driving mode. In the preparatory driving in the second preparatory driving mode, an ON time Ton of the switch elements 3112 in one row is shortened, a wait time Tw between frames is shortened, as illustrated in FIG. 7, and a plurality of rows is turned ON at a time as illustrated in FIG. 8, for example.

As described above, a plurality of preparatory driving modes is different from each other in the number of times of turning ON the switch elements 3112 per unit time for charge transfer as illustrated in FIGS. 6 to 8, for example.

FIG. 5 illustrates an example of the above-described relationship. The accumulation time Ta has two types, that is, a time longer than Ta1 and a time equal to or shorter than Ta1. The preparatory driving mode include two types, that is, the first preparatory driving mode and the second preparatory driving mode in which the preparatory driving is completed in a time shorter than that in the first preparatory driving mode. The lookup table 212 is a lookup table from which the imaging preparation time Tp is selectable based on each condition. The relationship between the imaging preparation times Tp is Tp 11>Tp12, Tp21>Tp22 in the same accumulation time Ta, and is Tp11>Tp21, Tp12>Tp22 in the same preparatory driving mode.

The relationships among the accumulation time Ta, the preparatory driving mode, and the imaging preparation time Tp are defined as characteristics of the individual radiographic imaging apparatus. Thus, the lookup table 212 can be defined from the design values or the specification values of the radiographic imaging apparatus.

Operations for a transition from the standby state to the imaging enabled state will be described with reference to FIGS. 9A and 9B. A description will be given of a case in which the power supply unit 404 is in operation, although not illustrated, because these states are of the powered ON state.

FIG. 9A is a diagram illustrating an operation example of the radiation generation apparatus 123 in the instrument carriage 120, and FIG. 9B is a diagram illustrating an operation example of the radiation generation apparatus 113 in the radiological room 110. In general, the radiation generation apparatus 113 in the radiological room 110 is higher in performance than the radiation generation apparatus 123 in the instrument carriage 120 in many cases, and can perform irradiation preparations in the short irradiation preparation time Tg. The radiation generation apparatus 113 in the radiological room 110 can perform higher-power irradiation than the radiation generation apparatus 123 in the instrument carriage 120 in many cases, and may take the short irradiation time Tx, although which depends on the body part to be imaged, the imaging procedure, and other conditions.

In the example of a case of the instrument carriage 120 illustrated in FIG. 9A, an irradiation preparation time Tg1 is set to Tg1>Tp 11, and an irradiation time Tx1 for imaging in this case is set to Tx1>Ta1. In the example of a case of the radiological room 110 illustrated in FIG. 9B, an irradiation preparation time Tg2 is set to Tp22<Tg2<Tp21, and an irradiation time Tx2 for imaging in this case is set to Tx2<Ta1.

In the example of the case of the instrument carriage 120 illustrated in FIG. 9A, in the standby state, the power supply unit 404 does not supply power to the sensor unit 403 and the drive unit 402, but supplies power to the control unit 401. Consequently, the radiographic imaging apparatus 101 is operated such that the sensor unit 403 and the drive unit 402 are not in operation but the control unit 401 is in operation.

Next, in response to the preparation request switch 201 being pressed, the power supply unit 404 starts to supply power to the drive unit 402, and the drive unit 402 starts operation. In a case where the drive unit 402 includes an FPGA, a circuit configuration is performed after the start of power supply, and an initialization and other operations are performed. Then, the drive unit 402 starts operation. The power supply unit 404 supplies power to the sensor unit 403, and the sensor unit 403 performs preparatory driving until the electric charge accumulation characteristics of the sensor 310 becomes stable and the artifact becomes smaller than a certain value.

The drive unit 402 controls the sensor unit 403 to perform preparatory driving, and the sensor unit 403 performs the preparatory driving under the control. The time from when the preparation request switch 201 is pressed until when the preparatory driving is completed is the imaging preparation time Tp 11. Since the imaging preparation time Tp11 is equal to or shorter than the irradiation preparation time Tg1, the user does not need to wait the irradiation preparation time Tg1 of the radiation generation apparatus or longer, and can perform an imaging operation with optimum power consumption.

Similarly, in the example of the case of the radiological room 110 illustrated in FIG. 9B, in the standby state, operations from power supplying to the preparatory driving are performed. The time from when the preparation request switch 201 is pressed until when the preparatory driving is completed is the imaging preparation time Tp22. Since the imaging preparation time Tp22 is equal to or shorter than the irradiation preparation time Tg2, the user does not need to wait the irradiation preparation time Tg2 of the radiation generation apparatus or longer, and can perform an imaging operation with optimum power consumption.

Figure 10:
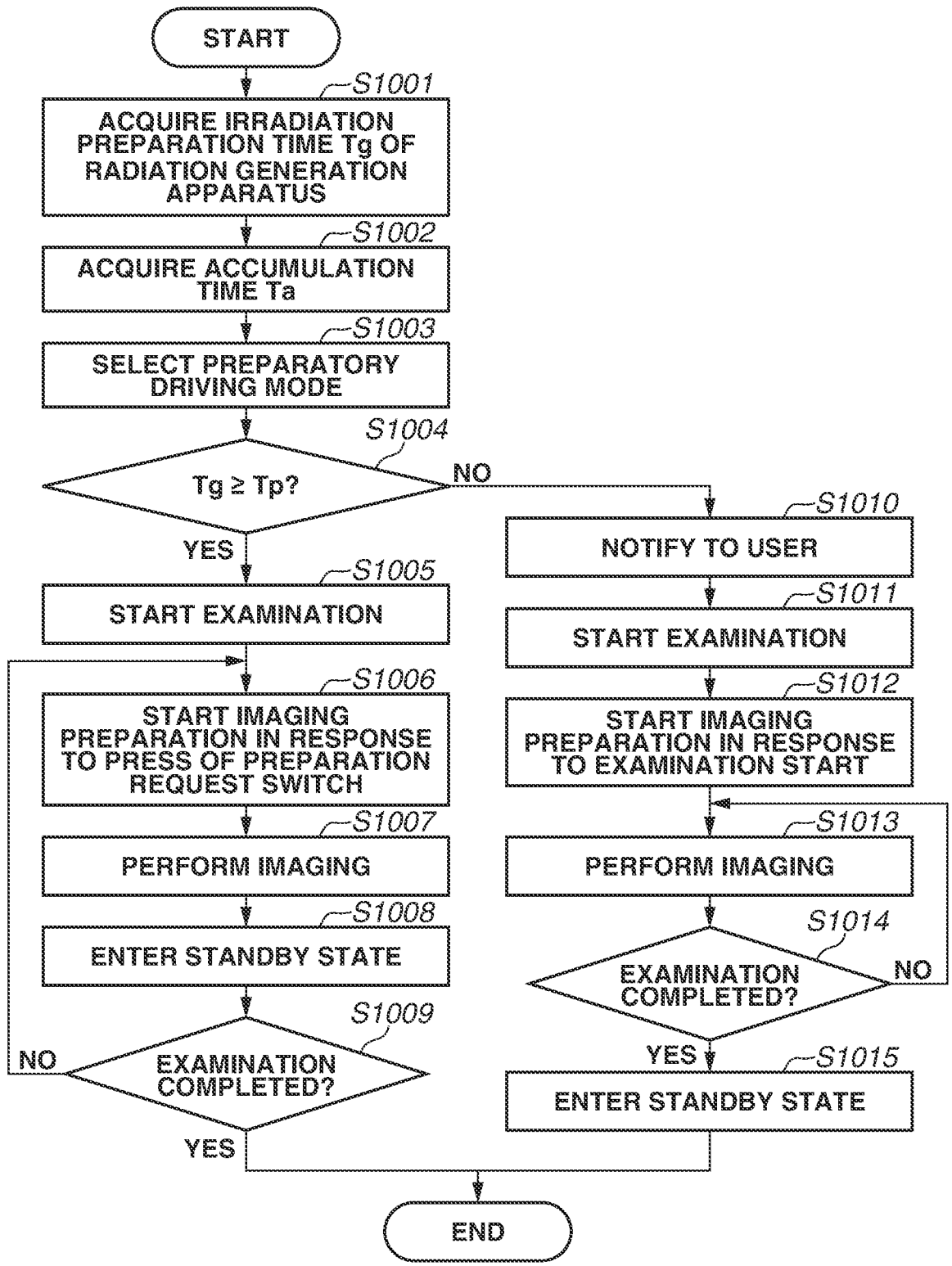
FIG. 10 is a flowchart illustrating an example of a processing procedure.

FIG. 10 is a flowchart illustrating a control method of the radiographic imaging system 100. Hereinafter, a flow of operations of the selection unit 211 and radiographic imaging will be described.

First, in step S1001 in FIG. 10, the selection unit 211 acquires the irradiation preparation time Tg of the radiation generation apparatus. The irradiation preparation time Tg is a radiation irradiation preparation time that is different between the radiation generation apparatuses 113 and 123. Examples of procedures for obtaining the irradiation preparation time Tg include a procedure in which time information to be used for irradiation preparation of the radiation generation apparatus is set to the radiographic imaging apparatus. The irradiation preparation time Tg can be obtained from the specification values or design values of the radiation generation apparatus, and the person in charge of installation of the radiographic imaging apparatus can set the irradiation preparation time Tg in the installation of the apparatus. Information for specifying the radiation generation apparatus or irradiation preparation time information may be contained in protocols so that the irradiation preparation time Tg can be acquired from the console. In a case where the radiation generation apparatus has the irradiation preparation time Tg which is fixed under any irradiation condition, the irradiation preparation time Tg can be determined based on the information for specifying the radiation generation apparatus to be used for imaging. The irradiation preparation time Tg may be obtained through communication between the radiographic imaging apparatus and the radiation generation apparatus. After the irradiation preparation time Tg is obtained through the communication between the console or another device and the radiation generation apparatus, the device having obtained the information may notify the radiographic imaging apparatus of the irradiation preparation time Tg. The value of the irradiation preparation time Tg may be acquired from the radiation generation apparatus, or radiation may be emitted without a subject and the irradiation preparation time Tg may be measured.

The irradiation preparation time Tg may vary to some extent even under the same condition. In addition, the irradiation preparation time Tg may vary with a change in the irradiation conditions, such as X-ray tube voltage. Thus, the irradiation preparation time Tg may be defined as the average value, minimum value, or maximum value of these variations, or may be set to a different value on an irradiation condition basis. The irradiation preparation time Tg may be acquired every time the radiographic imaging apparatus is activated or initialized, or may be acquired in a case where the radiation generation apparatus is replaced or the irradiation conditions are changed. Furthermore, the irradiation preparation time Tg may be held and managed in the radiographic imaging apparatus, the console, or another device, as a parameter in association with the type of the radiographic generation apparatus, the individual body, the imaging procedure, the irradiation conditions, and the like.

A description will be given using one specific example of a method in which the radiographic imaging apparatus 101 acquires the irradiation preparation time Tg to be used for irradiation preparation of the radiation generation apparatus 113. In response to the preparation request switch 1141 and the irradiation request switch 1142 of the radiation generation apparatus 113 being pressed at the same time, the radiation generation apparatus 113 notifies the radiographic imaging apparatus 101 that a radiation irradiation preparation request has been issued. The radiographic imaging apparatus 101 activates a timer to measure a lapse of time from the receipt of the radiation irradiation preparation request. When the radiation irradiation is enabled, the radiation generation apparatus 113 sends a radiation irradiation request to the radiographic imaging apparatus 101. In response to receipt of the radiation irradiation request, the radiographic imaging apparatus 101 checks the timer to obtain the time from when the radiographic imaging apparatus 101 has received the radiation irradiation preparation request. In the measurement, the radiographic imaging apparatus 101 can obtain the irradiation preparation time Tg. With this method, the irradiation preparation time Tg can be measured in the installation of the radiographic imaging apparatus 101.

In this example, the preparation request switch 1141 and the irradiation request switch 1142 are pressed at the same time. However, the present disclosure is not limited to this example. The preparation request switch 1141 and the irradiation request switch 1142 may be pressed with a time difference therebetween within the irradiation preparation time Tg. Instead of receipt of the radiation irradiation request, a technique for the radiographic imaging apparatus 101 to automatically detect radiation irradiation may be used to detect the start of radiation irradiation. The radiographic imaging apparatus 101 can also obtain the irradiation preparation time Tg by checking the timer in response to the detection and measuring the time having elapsed from the receipt of the radiation irradiation preparation request. As described above, since the irradiation preparation time Tg may vary to some extent even under the same irradiation condition or may have different values in accordance with irradiation conditions, the above-described operation may be performed a plurality of number of times to acquire the average value, the minimum value, or the maximum value, or another value on an irradiation condition basis.

Next, in step S1002, the selection unit 211 acquires the accumulation time Ta in this imaging operation. The accumulation time Ta is a time during which electric charges generated in accordance with the incident radiation are accumulated. Since the irradiation time Tx may vary based on the body part to be imaged, the imaging procedure, or the subject as described above, the selection unit 211 acquires the accumulation time Ta corresponding to the variation from the console 112 at each time of imaging. In a case where the console 112 receives an imaging order from the in-hospital system, the user selects protocols to be used for imaging. The protocols contain the radiographic imaging apparatus to be used for imaging and imaging conditions, and part of information in the protocols is the accumulation time Ta. The selection unit 211 acquires the information. With respect to one imaging order, a plurality of number of images may be captured or different imaging conditions may be set, and thus the protocols are collectively selected in advance for imaging to be performed.

The time during which the radiation generation apparatus 113 emits radiation is set together with the X-ray tube voltage, the X-ray tube current, and the like via the input interface on the radiation generation apparatus 113. The time during which the radiation generation apparatus 113 actually emits radiation may be set via the interface on the console 112 through cooperation of the console 112 and the radiation generation apparatus 113. In a case where the irradiation time Tx is set to be longer than the accumulation time Ta that has been set, the irradiation will be stopped after a lapse of the accumulation time Ta through the communication between the radiographic imaging apparatus and the radiation generation apparatus. Thus, in a case where a setting of Ta<Tx is performed, some notification may be issued to the user at that point in time.

Next, in step S1003, the selection unit 211 uses the lookup table 212 to select an optimum preparatory driving mode from among the plurality of preparatory driving modes, based on the acquired irradiation preparation time Tg and accumulation time Ta. Specifically, the selection unit 211 selects, from the lookup table 212, the preparatory driving mode having the imaging preparation time Tp equal to or shorter than the irradiation preparation time Tg, in the acquired accumulation time Ta. The imaging preparation time Tp is a period of time for transition from the standby state to the imaging enabled state. The irradiation preparation time Tg is a radiation irradiation preparation time of the radiation generation apparatus 113. The plurality of preparatory driving modes is different from each other in the imaging preparation time Tp. In a case where the selection under the above-described conditions is not able to be performed, the selection unit 211 selects the preparatory driving mode in which the imaging preparation time Tp is not equal to or shorter than the irradiation preparation time Tg.

Next, in step S1004, the selection unit 211 determines whether, as a result of the selection in step S1003, the preparatory driving mode in which the imaging preparation time Tp is equal to or shorter than the irradiation preparation time Tg has been selected. In a case where the selection unit 211 determines that the preparatory driving mode in which the imaging preparation time Tp is equal to or shorter than the irradiation preparation time Tg has been selected (YES in step S1004), the processing proceeds to step S1005. In a case where the selection unit 211 determines that the preparatory driving mode in which the imaging preparation time Tp is not equal to or shorter than the irradiation preparation time Tg has been selected (NO in step S1004), the processing proceeds to step S1010.

In step S1005, the console 112 outputs an examination start signal. In order to perform driving for completing the imaging preparation in a period of time equal to or shorter than the irradiation preparation time Tg, the radiographic imaging apparatus 101 remains in the standby state even at the start of the examination.

Next, in step S1006, the subject is called in and checked, the imaging preparations, such as setting the positions and postures of the X-ray tube and the subject, are performed, and then the user presses the preparation request switch 1141. In a case where the preparation request switch 1141 and the irradiation request switch 1142 are pressed at the same time, the radiation generation apparatus 113 notifies the radiographic imaging apparatus 101 that the radiation irradiation preparation request of the radiation generation apparatus 113 has been issued. In response to the preparation request switch 1141 being pressed, the radiation generation apparatus 113 performs a transition to the radiation irradiation-enabled state after a lapse of the irradiation preparation time Tg, and transmits a radiation irradiation request to the radiographic imaging apparatus 101. In response to the preparation request reception unit 214 receiving the radiation irradiation preparation request from the radiation generation apparatus 113, the radiographic imaging apparatus 101 performs a transition from the standby state to the imaging enabled state after a lapse of the imaging preparation time Tp. The drive unit 402 performs preparatory driving in the preparatory driving mode selected by the selection unit 211 during the imaging preparation time Tp. The imaging preparation time Tp and the irradiation preparation time Tg are started in response to the radiation irradiation preparation request of the radiation generation apparatus 113. The timing for starting the imaging preparation time Tp and the timing for starting the irradiation preparation time Tg are substantially the same. The power consumption in the standby state is smaller than the power consumption in the imaging enabled state. After a lapse of the irradiation preparation time Tg of the radiation generation apparatus 113, the processing proceeds to step S1007.

Next, in step S1007, the radiation generation apparatus 113 is in the imaging enabled state and the irradiation request switch 1142 has been pressed. Thus, after a lapse of the irradiation preparation time Tg, the radiation generation apparatus 113 emits radiation.

The radiographic imaging apparatus 101 performs image capturing, reads an image, and transfers the image to the console 112. Specifically, after the transition to the imaging enabled state, the drive unit 402 captures a radiographic image based on the incident radiation.

Next, in step S1008, in order to reduce the power consumption, the radiographic imaging apparatus 101 desirably enters into the standby state again after the end of the image reading or the image transferring.

Next, in step S1009, in a case where a plurality of images is to be captured, the console 112 determines whether the examination has been completed. In a case where the console 112 determines that the examination has not been completed (NO in step S1009), the processing returns to step S1006 and the above-described processing is repeated. In a case where the console 112 determines that the examination has been completed (YES in step S1009), the processing in the flowchart of FIG. 10 is ended.

In step S1010, the selection unit 211 instructs the control unit 401 to notify the user of the result of the determination in step S1104. The control unit 401 or the console 112 functions as a notification unit to notify the user of the result of the determination in step S1104. The notification to the user may be performed via the user interface of the radiographic imaging apparatus 101. As a user friendly notification method, a graphic user interface (GUI) or a message on the console 112 may be used. The notification to the user may be performed in combination with a sound announcement or the like.

Next, in step S1011, the console 112 outputs an examination start signal. Then, in step S1012, when the console 112 outputs the examination start signal, the radiation generation apparatus 113 performs a transition to the radiation irradiation-enabled state after a lapse of the irradiation preparation time Tg, and the radiographic imaging apparatus 101 performs a transition from the standby state to the imaging enabled state after a lapse of the imaging preparation time Tp. The drive unit 402 performs preparatory driving in the preparatory driving mode selected by the selection unit 211 during the imaging preparation time Tp. The imaging preparation time Tp and the irradiation preparation time Tg are started in response to the examination start signal. The timing for starting the imaging preparation time Tp and the timing for starting the irradiation preparation time Tg are substantially the same. After the radiation generation apparatus 113 have entered the radiation irradiation-enabled state and the radiographic imaging apparatus 101 have entered the imaging enabled state, the processing proceeds to step S1013.

In step S1013, the radiation generation apparatus 113 emits radiation, and the radiographic imaging apparatus 101 performs image capturing, reads an image, and transfers the image. Specifically, after the transition to the imaging enabled state, the drive unit 402 captures a radiographic image based on the incident radiation. After that, the radiographic imaging apparatus 101 remains in the imaging enabled state.

Next, in step S1014, in a case where a plurality of images is to be captured, the console 112 determines whether the examination has been completed. In a case where the console 112 determines that the examination has not been completed (NO in step S1014), the processing returns to step S1013 and the above-described processing is repeated. In a case where the console 112 determines that the examination has been completed (YES in step S1014), the processing proceeds to step S1015.

In step S1015, the radiographic imaging apparatus 101 performs a transition from the imaging enabled state to the standby state. After that, the process in the flowchart of FIG. 10 is ended.

In the present exemplary embodiment, in a case where the preparatory driving mode not satisfying Tg≥Tp is selected, the radiographic imaging apparatus 101 performs a transition from the standby state to the imaging enabled state in response to the examination start instruction. However, the present disclosure is not limited to this example. The radiographic imaging apparatus 101 may notify the user that the waiting time will be long (the waiting time is Tp, not Tg), and then perform a transition from the standby state to the imaging enabled state in response to the preparation request switch 1141 being pressed. In the present exemplary embodiment, the radiographic imaging apparatus 101 remains in the imaging enabled state until the examination is completed. However, the radiographic imaging apparatus 101 may have to wait for a long time without imaging because there is a need to perform preparations again during the examination. In this case, the radiographic imaging apparatus 101 may set a timeout period in such a manner that, after a lapse of a certain period of time, the radiographic imaging apparatus 101 performs a transition from the imaging enabled state to the standby state.

As described above, according to the present exemplary embodiment, regarding the cancellation of the standby state, the selection unit 211 can optimally select the preparatory driving mode for cancellation of the standby state from the viewpoints of power consumption and user stress reduction. In the case of combining the radiation generation apparatus and the radiographic imaging apparatus different in characteristics, the radiographic imaging apparatus 101 can perform a transition from the standby state to the imaging enabled state in accordance with these characteristics, and can select operations with low power consumption while shortening the waiting time.

Second Exemplary Embodiment

Next, a second exemplary embodiment will be described with reference to FIG. 11. FIG. 11 is a flowchart illustrating a control method of a radiographic imaging system 100 according to the second exemplary embodiment. In the flowchart of FIG. 11, step S1101 is added to the beginning of the flowchart of FIG. 10. Hereinafter, differences of the second exemplary embodiment from the first exemplary embodiment will be described.

First, in step S1101, a radiographic imaging apparatus 101 determines whether there is an external power supply to the radiographic imaging apparatus 101. A battery 230 may or may not be present. In a case where the radiographic imaging apparatus 101 determines that there is no external power supply (NO in step S1101), the processing proceeds to step S1001. Step S1001 and the subsequent steps are similar to those in FIG. 10. In a case where the radiographic imaging apparatus 101 determines that there is an external power supply (YES in step S1101), the processing proceeds to step S1011, and a selection unit 211 can select a preparatory driving mode in which an imaging preparation time Tp is equal to or shorter than an irradiation preparation time Tg or a preparatory driving mode in which the imaging preparation time Tp is not equal to or shorter than the irradiation preparation time Tg. Step S1011 and the subsequent steps are similar to those in FIG. 10.

In step S1011 and the subsequent steps, the radiographic imaging apparatus 101 performs a transition from the standby state to the imaging preparation state in response to an examination start instruction. Since noise in the captured image is reduced with increase in the duration time of the imaging enabled state, in the state where there is an external power supply, the image quality is often prioritized over the request for reduction of the power consumption. Thus, in a case where there is an external power supply, the processing proceeds to step S1011, and the control for selecting such an operation mode is enabled.

The steps other than the above-described one are similar to those in the first exemplary embodiment, and thus the detailed redundant description will be omitted.

In the first and second exemplary embodiments, the selection unit 211 and the lookup table 212 are in the radiographic imaging apparatus. Since the radiographic imaging apparatus is frequently operated under control from the console, the selection unit 211 and the lookup table 212 can be included in the console, not in the radiographic imaging apparatus, to implement similar functions. In that case, information on a preparatory driving mode determined by a selection unit and a lookup table in the console is transferred to a radiographic imaging apparatus, and the control unit 401 in the radiographic imaging apparatus operates the drive unit 402 in accordance with the information. In that case, the determinations and operations are similar to those in the first and second exemplary embodiments, and thus the detailed redundant description will be omitted.

Other Exemplary Embodiments

The present disclosure can also be achieved by supplying a program for implementing one or more functions in the above-described embodiments to a system or an apparatus via a network or a storage medium, and one or more processors in a computer of the system or the apparatus reading and executing the program. The present disclosure can also be achieved by a circuit (for example, an ASIC) for implementing the one or more functions.

The above-described exemplary embodiments are all mere specific examples for carrying out the present disclosure, and the technical scope of the present disclosure is not interpreted by these exemplary embodiments in a limited way. That is, the present disclosure can be carried out in various manners without deviating from the technical ideas or main features of the present disclosure.

According to the present disclosure, the time of transition from the standby state to the imaging enabled state of a radiographic imaging apparatus can be shortened.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-027567, filed Feb. 24, 2023, which is hereby incorporated by reference herein in its entirety.

What is claimed is:

1. A radiographic imaging apparatus comprising:
a selection unit configured to select a preparatory driving mode from among a plurality of preparatory driving modes; and
a drive unit configured to perform preparatory driving in the preparatory driving mode selected by the selection unit during a transition time of transition from a standby state to an imaging enabled state,
wherein the plurality of preparatory driving modes is different from each other in the transition time of transition from the standby state to the imaging enabled state, and
wherein the selection unit selects a preparatory driving mode from among the plurality of preparatory driving modes such that the transition time of transition from the standby state to the imaging enabled state is equal to or shorter than a radiation irradiation preparation time of a radiation generation apparatus.

2. The radiographic imaging apparatus according to claim 1, wherein a timing for starting the transition time and a timing for starting the radiation irradiation preparation time are substantially the same.

3. The radiographic imaging apparatus according to claim 1, wherein the transition time and the radiation irradiation preparation time are started in response to a preparation request.

4. The radiographic imaging apparatus according to claim 3, wherein the preparation request is a radiation irradiation preparation request of the radiation generation apparatus.

5. The radiographic imaging apparatus according to claim 1, wherein power consumption in the standby state is lower than power consumption in the imaging enabled state.

6. The radiographic imaging apparatus according to claim 1, wherein after the transition to the imaging enabled state, the drive unit captures a radiographic image based on incident radiation.

7. The radiographic imaging apparatus according to claim 6, wherein the selection unit selects a preparatory driving mode from among the plurality of preparatory driving modes, based on the radiation irradiation preparation time of the radiation generation apparatus and an accumulation time during which electric charges generated in accordance with the incident radiation are accumulated.

8. The radiographic imaging apparatus according to claim 6, wherein after the capturing of the radiographic image, a transition to the standby state is performed.

9. The radiographic imaging apparatus according to claim 1, wherein the plurality of preparatory driving modes is different from each other in the number of times of turning ON a switch for transferring the electric charges per unit time.

10. The radiographic imaging apparatus according to claim 1, further comprising a notification unit configured to perform, in a case where the selection unit selects a preparatory driving mode in which the transition time of transition from the standby state to the imaging enabled state is not equal to or shorter than the radiation irradiation preparation time of the radiation generation apparatus, notification of the selection.

11. The radiographic imaging apparatus according to claim 4,
wherein in a case where the selection unit selects a preparatory driving mode in which the transition time of transition from the standby state to the imaging enabled state is equal to or shorter than the radiation irradiation preparation time of the radiation generation apparatus, the transition time and the radiation irradiation preparation time are started in response to the radiation irradiation preparation request of the radiation generation apparatus, and
wherein in a case where the selection unit selects a preparatory driving mode in which the transition time of transition from the standby state to the imaging enabled state is not equal to or shorter than the radiation irradiation preparation time of the radiation generation apparatus, the transition time and the radiation irradiation preparation time are started in response to a start signal.

12. The radiographic imaging apparatus according to claim 4,
wherein in a case where there is no external power supply to the radiographic imaging apparatus, the selection unit selects a preparatory driving mode such that the transition time of transition from the standby state to the imaging enabled state is equal to or shorter than the radiation irradiation preparation time of the radiation generation apparatus, and the transition time and the radiation irradiation preparation time are started in response to the radiation irradiation preparation request of the radiation generation apparatus, and
wherein in a case where there is an external power supply to the radiographic imaging apparatus, the selection unit is capable of selecting a preparatory driving mode such that the transition time of transition from the standby state to the imaging enabled state is equal to or shorter than the radiation irradiation preparation time of the radiation generation apparatus, and the transition time and the radiation irradiation preparation time are started in response to a start signal.

13. A radiographic imaging system comprising:
a radiographic imaging apparatus; and
a selection unit configured to select a preparatory driving mode from among a plurality of preparatory driving modes,
wherein the radiographic imaging apparatus includes a drive unit configured to perform preparatory driving in the preparatory driving mode selected by the selection unit during a transition time of transition from a standby state to an imaging enabled state,
wherein the plurality of preparatory driving modes is different from each other in the transition time of the transition from the standby state to the imaging enabled state, and
wherein the selection unit selects a preparatory driving mode from among the plurality of preparatory driving modes such that the transition time of transition from the standby state to the imaging enabled state is equal to or shorter than a radiation irradiation preparation time of a radiation generation apparatus.

14. The radiographic imaging system according to claim 13, wherein a timing for starting the transition time and a timing for starting the radiation irradiation preparation time are substantially the same.

15. The radiographic imaging system according to claim 13, wherein the transition time and the radiation irradiation preparation time are started in response to a preparation request.

16. The radiographic imaging system according to claim 13, wherein power consumption in the standby state is lower than power consumption in the imaging enabled state.

17. The radiographic imaging system according to claim 13, wherein after the transition to the imaging enabled state, the drive unit captures a radiographic image based on incident radiation.

18. The radiographic imaging system according to claim 13, wherein the plurality of preparatory driving modes is different from each other in the number of times of turning ON a switch for transferring the electric charges per unit time.

19. The radiographic imaging system according to claim 13, wherein the radiographic imaging system or the radiographic imaging apparatus further includes a notification unit configured to perform, in a case where the selection unit selects a preparatory driving mode in which the transition time of transition from the standby state to the imaging enabled state is not equal to or shorter than the radiation irradiation preparation time of the radiation generation apparatus, notification of the selection.

20. A control method for a radiographic imaging apparatus comprising:
 selecting a preparatory driving mode from among a plurality of preparatory driving modes; and
 performing preparatory driving in the preparatory driving mode selected by the selection during a transition time of transition from a standby state to an imaging enabled state,
 wherein the plurality of preparatory driving modes is different from each other in the transition time of transition from the standby state to the imaging enabled state, and
 wherein a preparatory driving mode is selected from among the plurality of preparatory driving modes such that the transition time of transition from the standby state to the imaging enabled state is equal to or shorter than a radiation irradiation preparation time of a radiation generation apparatus.

* * * * *